G. LINDAHL.
TIRE BOLT WRENCH.
APPLICATION FILED JAN. 21, 1909.
937,944.
Patented Oct. 26, 1909.
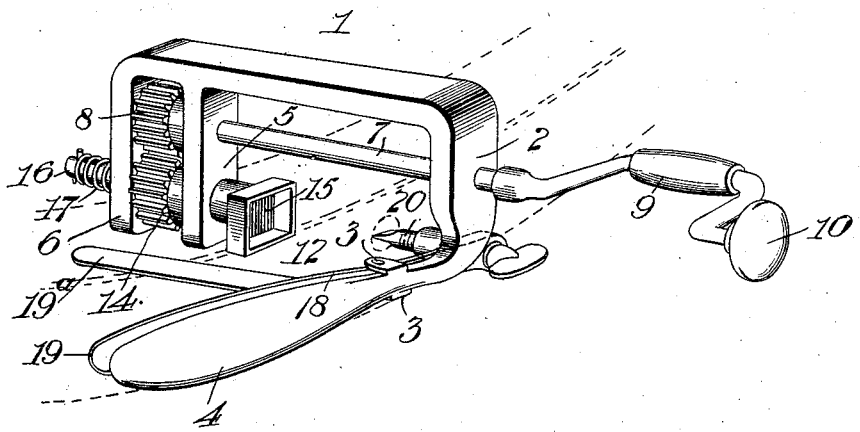
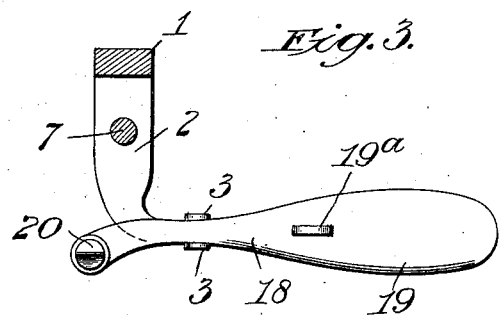
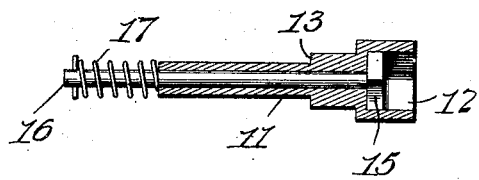
Witnesses
Inventor
Gustavus Lindahl
By J. Dushane
his Attorney

UNITED STATES PATENT OFFICE.

GUSTAVES LINDAHL, OF NEW CARLISLE, INDIANA.

TIRE-BOLT WRENCH.

937,944.

Specification of Letters Patent.　Patented Oct. 26, 1909.

Application filed January 21, 1909. Serial No. 473,551.

*To all whom it may concern:*

Be it known that I, GUSTAVES LINDAHL, citizen of the United States, residing at New Carlisle, in the county of St. Joseph and State of Indiana, have invented certain new and useful Improvements in Tire-Bolt Wrenches, of which the following is a specification.

This invention relates to tire bolting machines, and has specially in view a machine of the type specified in which the labor of bolting a tire to a wheel rim, or its removal therefrom will be greatly facilitated, and one in which such operations may be readily performed by one workman.

With the above and many other objects in view, the invention contemplates a machine for operating upon bolts of tires in which a novel type of frame is employed and carries nut-engaging and bolt-engaging members, the nut-engaging member being a rotatable one and provided with supplemental mechanism by means of which the nut may be readily disengaged therefrom, such for instance as when a nut is being removed from a bolt, thereby obviating the disadvantage of having a nut becoming tightly wedged into engagement with the head.

In carrying out the objects of the invention generally stated above, it will, of course, be readily understood that the essential details of the same are susceptible of wide variations in details and structural arrangements, but a preferred and practical embodiment of the same is shown in the accompanying drawings, wherein—

Figure 1 is a perspective view of the bolting machine, a dotted representation of a portion of a wheel rim and tire being shown to illustrate the practical application of the invention. Fig. 2 is a longitudinal sectional view of the nut engaging socket. Fig. 3 is a detail sectional view of the hand-grip extension of the handle of the machine.

Like characters of reference designate corresponding parts in all the figures of the drawings.

Referring to said drawings, the improved bolting machine comprises in its general organization a frame 1, one end portion of which has an elongated right-angular extension 2 the intermediate portion of which carries outstanding pivot ears 3, and the extreme free end portion of which is provided with a hand grip 4. The other end portion of the frame carries two spaced apart right-angular extensions 5 and 6, which, in connection with the top portion of the frame form a gear housing, as will be more fully described. The angular extensions 5 and 6 and the extension 2, all have a bearing for the reception of a brace shaft 7, the portion of which that is between the extensions 5 and 6 having a pinion, or cog-wheel 8 fast thereon. Said brace shaft 7 projects beyond the extension 2 and is provided with a crank portion 9 carrying a hand grip, and beyond said crank portion the same is provided with a steadying handle 10, the structure being similar in all respects to the usual brace and bit structure.

The lower portion of the angular extensions 5 and 6 have alined openings formed through them for the reception of the shank 11 of a nut engaging socket 12, said socket 12 being provided with an abutment shoulder 13 which serves to limit the movement of the socket and shank in one direction through the alined openings through the side extensions 5 and 6. The portion of the shank within the gear housing has a pinion or gear wheel 14 fast thereon which is in engagement with the pinion or gear 8 of the brace shaft, so that when said brace shaft is rotated a corresponding movement will be imparted to the shank and socket. A plunger 15 is held within the socket 12 by means of a shaft 16 which extends through the shank 11, the end of said shaft 16 projecting beyond the outer angular extension 6 and having a spring 17 coiled thereon, one end of which is fast to said shaft and the other end bearing against the end of the shank 11 and constantly exerting a pressure on shaft 16 to cause the plunger 15 to lie in the bottom of the socket 12. The socket 12 may be of the rectangular shape shown in the accompanying drawings, or any other shape desired or necessary in accordance with the shape of the nuts to be engaged thereby, and the plunger 15 is shaped to correspond with the socket.

The elongated extension 2 of the frame 1 has a handle 18 pivotally mounted between its pivot ears 3, the outer end of said handle 18 being provided with a hand grip 19 and a right angular extension 19ª which rests on the rim of the wheel when the tire bolts and nuts are being removed therefrom so as to steady the machine. The inner end of the handle 18 has a threaded opening formed therein for the reception of a similarly threaded end of a bolt engaging tool 20 the free end of which is shaped similar to a screw-driver and adapted to engage with the slotted head of a bolt so as to hold the same stationary while the nut is being removed therefrom.

In using the machine to remove nuts and bolts from a tire, the socket 12 is placed over the nut and the tool 20 has its sharpened point placed in engagement with the slotted head of the bolt, as is shown by dotted lines in Fig. 2. The pivotally mounted handle 18 is then depressed to hold the tool in engagement with the bolt, and also to hold the extension 19ª on the wheel rim. When in this position, it will be seen that when the brace shaft is revolved, a corresponding movement will be imparted to the socket 12 to rotate the nut on the bolt and remove the same — the bolt being held immovable through the engagement therewith of the tool 20. After removal of the nut, the same remains in the socket 12, whereupon by tapping the spring-carrying end of the plunger shaft, the nut will be discharged from the socket by the plunger.

It will be seen from the foregoing that the machine is one that can be readily operated by one workman, and through the described arrangement of the hand grips—that is a stationary grip and a pivotally mounted grip, the labor of holding the bolt while the nut is being removed can be performed by one hand, leaving the other hand free to impart the rotary movement to the brace shaft to rotate the nut socket and thereby remove the nut. It will also be seen that the provision of the nut-engaging socket with the movable plunger for removing or discharging the nuts therefrom obviates the labor incident to the removal of nuts from sockets such as is incidental to tight, or wedging fits between nuts and sockets.

I claim as my invention:—

1. A machine of the character described comprising a frame carrying at one end a rotatable nut engaging socket, a plunger for removing nuts from said socket, a pivotally mounted handle at the other end of said frame, and an endwise adjustable bolt engaging tool carried by said handle and a rim-engaging member rigidly projecting from said handle.

2. A machine of the character described comprising a frame provided with a rotatable nut engaging socket, means for imparting a rotary movement to said socket, a reciprocatory plunger movable in said socket and having its shank passed through one of the gears of the rotating means, and a pivotally mounted bolt engaging tool carried by said frame a pivotally mounted handle and a rim-engaging extension rigid with said handle.

3. A machine of the character described comprising a frame carrying a rotatable nut engaging socket, a plunger slidably mounted in said socket and adapted to discharge nuts therefrom, a pivotally mounted handle, and a rotatably mounted bolt engaging tool carried by said handle for holding the bolt stationary while the nut is being removed therefrom and a rim-engaging member rigid with said handle.

4. A machine of the character described comprising a frame having a nut engaging socket rotatably mounted in one end portion, a stationary extension carried by the other end of said frame, a hand grip having a pivotal engagement with the stationary extension, a rim engaging extension extending parallel with the shank of said socket and carried by the hand grip constructed to rest on the rim of the wheel, a bolt tool carried by the inner end of said hand grip for engaging with a bolt to hold the same while the nut is being removed therefrom, and means carried by the frame for imparting a rotary movement to the nut-engaging socket.

5. A machine of the character described comprising a frame having a gear housing at one end and an elongated stationary handle at the other end, a shaft extending through said handle and the gear housing and provided with a handle for rotating the same, a gear on the shaft within the gear housing, a socket shank extending through said gear housing below the shaft, a gear on said shank meshing with the first mentioned gear, said socket shank projecting to both sides of said gear housing and provided with a socket at one end for engaging with a nut, a plunger in said socket and provided with a shaft extending through the socket shank, a spring on said shaft exerting a pressure to retain said plunger in the socket, a pivotally mounted handle carried by the stationary handle, an adjustable bolt engaging tool carried by one end of said pivotally mounted handle, and a rim engaging extension carried by the other end of said pivotally mounted handle.

6. A machine of the character described comprising a frame having spaced apart angular extensions at one end and an elongated stationary handle at the other end, a nut engaging socket carried by said spaced apart extensions, a plunger slidably mounted in said socket and adapted to discharge nuts therefrom, a pivotally mounted handle carried by the stationary handle, a bolt engaging tool detachably carried by the inner end of said pivoted handle for holding the bolt while the nut is being removed therefrom, and a rim engaging extension carried by the other end of said pivoted handle.

In testimony whereof I affix my signature, in presence of two witnesses.

GUSTAVES LINDAHL.

Witnesses:
 EDWD. F. DUBERIL,
 DOLLY HOUCK.